(12) United States Patent
Chung et al.

(10) Patent No.: US 10,459,522 B2
(45) Date of Patent: Oct. 29, 2019

(54) SYSTEM AND METHOD FOR INDUCING SOMATIC SENSE USING AIR PLASMA AND INTERFACE DEVICE USING THEM

(71) Applicant: Konkuk University Glocal Industry-Academic Collaboration Foundation, Chungju-si, Chungcheongbuk-do (KR)

(72) Inventors: Soon-Cheol Chung, Chungju-si (KR); Hyung-Sik Kim, Chungju-si (KR); Jae-Hoon Jun, Seoul (KR)

(73) Assignee: KONKUK UNIVERSITY GLOCAL INDUSTRY-ACADEMIC COLLABORATION FOUNDATION, Chungju-si, Chungcheongbuk-Do (KR)

( * ) Notice: Subject to any disclaimer, the term of this patent is extended or adjusted under 35 U.S.C. 154(b) by 69 days.

(21) Appl. No.: 15/367,281

(22) Filed: Dec. 2, 2016

(65) Prior Publication Data

US 2017/0364157 A1    Dec. 21, 2017

(30) Foreign Application Priority Data

Jun. 15, 2016 (KR) .................. 10-2016-0074588
Nov. 25, 2016 (KR) .................. 10-2016-0158245
(Continued)

(51) Int. Cl.
*G06F 3/01* (2006.01)
*G06F 3/042* (2006.01)

(52) U.S. Cl.
CPC .............. *G06F 3/016* (2013.01); *G06F 3/017* (2013.01); *G06F 3/042* (2013.01);
(Continued)

(58) Field of Classification Search
CPC ............. G06F 3/042; G06F 3/016; G06F 3/17
See application file for complete search history.

(56) References Cited

U.S. PATENT DOCUMENTS

2004/0046709 A1* 3/2004 Yoshino ............. H04N 13/0493
  345/6
2009/0001889 A1* 1/2009 Miles .................... G01N 22/00
  315/111.21
(Continued)

FOREIGN PATENT DOCUMENTS

JP   2003-233339 A   8/2003
JP   2010-078623 A   4/2010
(Continued)

OTHER PUBLICATIONS

Notice of Allowance for Korean Application No. 10-2016-0158245 dated Jan. 26, 2018 which corresponds to the above-referenced U.S. application.
(Continued)

*Primary Examiner* — Nelson M Rosario
*Assistant Examiner* — Scott Au
(74) *Attorney, Agent, or Firm* — LRK Patent Law Firm

(57) ABSTRACT

A system and method for generating air plasma by radiating a laser in the air, and making a user feel a somatic sense such as a tactile sense, a thermal sense or the like using a principle of inducing a state change in a medium as a result of a shock wave or an electric field generated by the air plasma.

18 Claims, 21 Drawing Sheets

(30) Foreign Application Priority Data

| Nov. 25, 2016 | (KR) | 10-2016-0158246 |
| Nov. 25, 2016 | (KR) | 10-2016-0158247 |
| Nov. 25, 2016 | (KR) | 10-2016-0158248 |
| Nov. 25, 2016 | (KR) | 10-2016-0158249 |
| Nov. 25, 2016 | (KR) | 10-2016-0158250 |

(52) U.S. Cl.
CPC .. *G06F 2203/013* (2013.01); *G06F 2203/014* (2013.01); *G06F 2203/04101* (2013.01)

(56) References Cited

U.S. PATENT DOCUMENTS

| 2014/0243804 A1* | 8/2014 | Lukac | A61B 18/203 606/9 |
| 2016/0246376 A1* | 8/2016 | Birnbaum | G06F 3/0488 |
| 2017/0025097 A1* | 1/2017 | Kuribayashi | G06F 3/147 |

FOREIGN PATENT DOCUMENTS

| JP | 2016-057780 A | 4/2016 |
| KR | 10-2003-0065766 A | 8/2003 |
| KR | 10-0617777 B | 8/2006 |
| KR | 10-2010-0006438 A | 1/2010 |
| KR | 10-2013-0009158 A | 1/2013 |
| KR | 10-2013-0039150 A | 4/2013 |
| KR | 10-1269098 B1 | 5/2013 |
| KR | 10-1340358 A | 12/2013 |
| KR | 10-1340359 A | 12/2013 |
| KR | 10-2014-0021087 A | 2/2014 |
| KR | 10-1375613 B1 | 3/2014 |
| KR | 10-2014-0061230 A | 5/2014 |
| KR | 10-2014-0063739 A | 5/2014 |
| KR | 10-1463788 B1 | 11/2014 |
| KR | 10-2015-0140807 A | 12/2015 |
| KR | 10-2016-0009423 A | 1/2016 |
| KR | 10-2016-0045293 A | 4/2016 |
| KR | 10-2016-0087261 A | 7/2016 |
| KR | 10-1648854 B1 | 8/2016 |

OTHER PUBLICATIONS

KIPO Office Action for Korean Application No. 10-2016-0158247 dated Feb. 13, 2018 which corresponds to the above-referenced U.S. application.

KIPO Office Action for Korean Application No. 10-2016-0158250 dated Feb. 1, 2018 which corresponds to the above-referenced U.S. application.

Notice of Allowance for Korean Application No. 10-2016-0074588 dated Jan. 31, 2018 which corresponds to the above-referenced U.S. application.

J.J. Camacho et al., "Spectroscopy study of air plasma induced by IR CO2 laser pulses", Applied Physics A, vol. 99, Issue 1, pp. 159-175, Apr. 2010.

Hugo Sobral et al., "Temporal evolution of the shock wave and hot core air in laser induced plasma", Applied Physics Letters, vol. 77, No. 20, pp. 3158-3160, Sep. 13, 2000.

Sung Jun Park, "A Study on the Characteristic of Shock wave and Electric field based on Laser-Induced Air Plasma", Thesis, Department of Biomedical engineering Graduate School of Konkuk University, 2016.

KIPO Office Action for Korean Patent Application No. 10-2016-0158248 dated Apr. 27, 2018 which corresponds to the above-referenced U.S. application.

KIPO Office Action for Korean Patent Application No. 10-2016-0158249 dated Jun. 8, 2018 which corresponds to the above-referenced U.S. application.

KIPO Office Action for Korean Patent Application No. 10-2016-0158246, dated Nov. 13, 2018, which corresponds to the above-referenced U.S. application.

KIPO Office Action for Korean Patent Application No. 10-2016-0158247, dated Jan. 11, 2019, which corresponds to the above-referenced U.S. application.

* cited by examiner (a) Shock wave signal measured by microphone (b) Shock wave signal when laser energy is 32mJ (c) Shock wave signal when laser energy is 60mJ

SYSTEM AND METHOD FOR INDUCING SOMATIC SENSE USING AIR PLASMA AND INTERFACE DEVICE USING THEM

CROSS-REFERENCE TO RELATED APPLICATIONS

This application claims priority under 35 U.S.C. § 119 to Korean Patent Application Nos. 10-2016-0074588, filed Jun. 15, 2016, 10-2016-0158245, filed Nov. 25, 2016, 10-2016-0158246, filed Nov. 25, 2016, 10-2016-0158247, filed Nov. 25, 2016, 10-2016-0158248, filed Nov. 25, 2016, 10-2016-0158249, filed Nov. 25, 2016, 10-2016-0158250, filed Nov. 25, 2016, the disclosures of which are incorporated herein by reference in their entirety.

BACKGROUND OF THE INVENTION

1. Field of the Invention

The present invention relates to a somatic sense induction system, and more specifically, to a system and method for generating air plasma by radiating a laser in the air, and making a user feel a somatic sense such as a tactile sense, a thermal sense or the like using a principle of inducing a state change in a medium as a result of a shock wave or an electric field generated by the air plasma.

2. Description of Related Art

Interest in induction of a somatic sense, which makes a user feel the somatic sense such as a tactile sense, a thermal sense or the like although the user does not directly contact with an object or approach a heat, is growing. A method of radiating an energy source such as a laser on a medium to induce a somatic sense is studied recently.

However, since such a method of directly radiating an energy source such as a laser on the skin of a user may accompany damage on a medium, the user may be damaged by burning or the like, and thus various measures are discussed to solve such a problem.

An object of the present invention is to induce a somatic sense of a user within a range of preventing damage on a biological tissue as described above, and the present invention has been made to satisfy the technical requirements described above and, in addition, to provide additional technical elements which cannot be easily invented by those skilled in the art.

SUMMARY OF THE INVENTION

The present invention has been made to make a user feel a somatic sense although it does not directly radiate a laser on a medium such as a skin tissue of a user.

Particularly, an object of the present invention is to generate air plasma in the air and stimulate a skin tissue of a user by utilizing energy emitted from the air plasma.

In addition, at this point, another object of the present invention is to induce a somatic sense using mechanisms different from each other by utilizing the energy emitted in different forms such as a shock wave, an electric field and the like among the forms of energy emitted from the air plasma.

The technical problems to be accomplished by the present invention are not limited to the technical problems mentioned above, and various technical problems may be included within a scope apparent to those skilled in the art.

To accomplish the above objects, according to one aspect of the present invention, there is provided a somatic sense induction system using air plasma, the system including: a laser radiation device for controlling parameters of a laser and generating the air plasma by radiating the laser in the air, in which a shock wave and an electric field generated by the air plasma may induce a state change in a medium existing in an area affected by the shock wave and the electric field.

In addition, the somatic sense induction system using air plasma may further include a lens for inducing the air plasma by gathering lasers radiated from the laser radiation device at one point.

In addition, in the somatic sense induction system using air plasma, the medium may include a skin of a human body.

In addition, at this point, the shock wave may induce a state change in the skin of the human body by making peripheral nerves generate an action potential by stimulating a cell in the skin of the human body.

In addition, the electric field may generate a potential in a cell of the skin of the human body and induce a state change in the skin of the human body by making peripheral nerves stimulated by the generated potential generate an action potential.

In addition, in the somatic sense induction system using air plasma, the parameters of the laser may include energy intensity, a pulse width, a pulse frequency, a stimulating time and a beam diameter.

In addition, in the somatic sense induction system using air plasma, the shock wave and the electric field generated by the air plasma may induce a state change in a medium existing at a certain point inside a virtual sphere around a position where the air plasma is generated.

In addition, in the somatic sense induction system using air plasma, wavelength of the pulse laser may be 1064 nm.

In addition, in the somatic sense induction system using air plasma, energy intensity of the pulse laser may be between 35 mJ and 65 mJ.

In addition, the somatic sense induction system using air plasma may further include a temperature sensing unit for sensing temperature of a heating element of an electric device, in which if the temperature sensed by the temperature sensing unit is higher than a preset temperature, the laser radiation unit may generate air plasma by radiating a laser at a point above the electric device.

In addition, the somatic sense induction system using air plasma may further include: an information collection unit for collecting biological information of a driver or driving information of a vehicle; and a drowsiness determination unit for receiving the biological information of a driver or the driving information of a vehicle and determining whether the driver is in a drowsy state, in which if it is determined by the drowsiness determination unit that the driver is in a drowsy state, the laser radiation device may generate air plasma by radiating a pulse laser at a point around the driver.

In addition, the somatic sense induction system using air plasma may further include: a camera for photographing a user, a motion detection unit for receiving an image photographed by the camera and detecting a motion of the user, and a position detection unit for receiving motion information of the motion detection unit and detecting a position where the motion of the user is generated, in which the laser radiation device may generate air plasma by radiating a pulse laser at a point around a position where the motion of the user is performed.

In addition, the somatic sense induction system using air plasma may further include: a movement tracking unit for tracking movement of a subject by radiating light on the subject and receiving the light reflected from the subject; and a coordinate creation unit for creating three-dimensional coordinates which express a position of the movement of the subject, in which the laser radiation device may receive the three-dimensional coordinates from the coordinate creation unit and generate air plasma according to the movement of the subject by radiating a pulse laser at the three-dimensional coordinates.

In addition, in the somatic sense induction system using air plasma, the laser radiation device may receive three-dimensional coordinates from a hologram creation unit and generate air plasma at a position where a hologram is created by radiating a pulse laser at the three-dimensional coordinates.

Meanwhile, according to another aspect of the present invention, there is provided a somatic sense induction method using air plasma, the method including the steps of generating the air plasma by radiating a laser in the air using a laser radiation device, in which a shock wave and an electric field generated by the air plasma may induce a state change in a medium existing in an area affected by the shock wave and the electric field.

In addition, the somatic sense induction method using air plasma may further include the step of setting parameters of the laser, before the step of generating the air plasma by radiating a laser in the air.

In addition, in the somatic sense induction method using air plasma, the shock wave and the electric field generated by the air plasma may induce a state change in a medium existing at a certain point inside a virtual sphere around a position where the air plasma is generated.

In addition, in the somatic sense induction method using air plasma, the step of setting parameters of the laser may include the steps of receiving input of the parameters of the laser from a user by the laser radiation device and setting parameters of a laser which will be radiated in the air according to the input of the parameters of the laser.

Meanwhile, according to still another aspect of the present invention, there is provided an interface device for handling a multimedia system of a vehicle, the interface device including: a laser radiation device for generating one or more air plasmas by continuously or periodically radiating a pulse laser in a preset space; a touch recognition unit for recognizing a touched area if any one of the one or more air plasmas is touched; and an execution unit for executing a command corresponding to the touched area.

In addition, the interface device for handling a multimedia system of a vehicle may further include a lens for inducing generation of air plasma by gathering lasers radiated from an air plasma generation unit at a point.

In addition, in the interface device for handling a multimedia system of a vehicle, wavelength of the pulse laser may be 1064 nm, and energy intensity of the pulse laser may be between 35 mJ and 65 mJ.

In addition, in the interface device for handling a multimedia system of a vehicle, a command corresponding to the preset space may be set in advance, and the execution unit may control to receive a touched space from the touch recognition unit and execute a corresponding command.

DETAILED DESCRIPTION OF THE PREFERRED EMBODIMENT

Details of the objects and technical configuration of the present invention and operational effects according thereto will be clearly understood by the following detailed description with reference to the accompanying drawings attached in the specification of the present invention. The embodiments according to the present invention will be described in detail with reference to the accompanying drawings.

The embodiments disclosed in this specification should not be interpreted or used to limit the scope of the present invention. It is apparent to those skilled in the art that the description including the embodiments of the present invention has various applications. Accordingly, certain embodiments disclosed in the detailed description of the present invention are merely provided for illustrative purposes to further clearly describe the present invention and should not be interpreted to limit the scope of the present invention to the embodiments.

The functional blocks shown in the figures and described below are merely examples of possible implementations. In other implementations, other functional blocks may be used without departing from the spirit and scope of the detailed description. In addition, although one or more functional blocks of the present invention are shown as individual blocks, one or more of the functional blocks of the present invention may be a combination of various hardware and software components executing the same function.

In addition, the expression of 'including' a component is an expression of an 'open type' which merely refers to existence of a corresponding component, and it should not be construed as precluding additional components.

Furthermore, although when a component is referred to as being "connected" or "coupled" to another component, it can be directly connected or coupled to the other component, it should be understood that intervening components may also exist therebetween.

Figure 1:
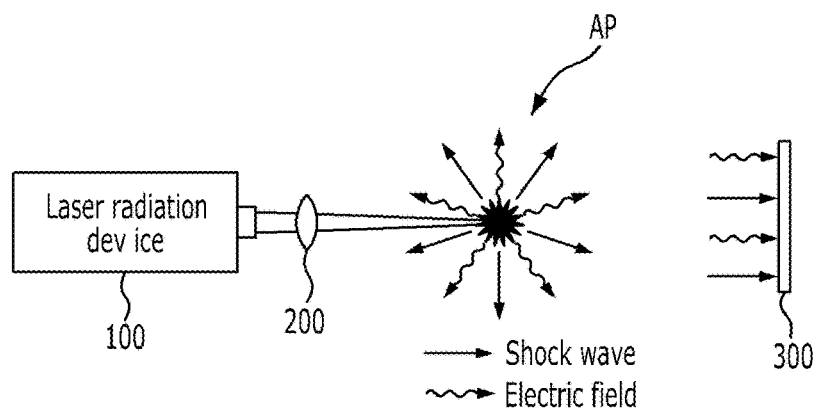
FIG. 1 is a view schematically showing the configuration of a somatic sense induction system according to the present invention.

FIG. 1 is a view schematically showing the configuration of a somatic sense induction system according to the present invention.

According to FIG. 1, a somatic sense induction system of the present invention includes a laser radiation device as a basic component and, additionally, may further include a lens 200.

First, the laser radiation device will be described. The laser radiation device controls various parameters of a laser and generates air plasma by radiating the laser in the air while the parameters are controlled.

To perform these functions, the laser radiation device specifically includes a lot of sub-components, and, for example, the laser radiation device may include a laser output unit, a frequency controller, an energy controller, a diameter controller, an input unit, a display and a control unit. Meanwhile, at this point, the control unit and the laser output unit are necessarily included to implement the laser radiation device 100, and the other functional units may be included or excluded as needed by a user.

The laser output unit is a component for outputting a pulse laser and may include a laser driver and a cooling device. The laser driver may include sub-devices such as a laser medium, an optical pump, an optical resonator and the like and creates an optical signal for implementing the pulse laser. In addition, the cooling device is a component for cooling down heat which can be generated in the process of generating an optical signal by the laser driver and performs a function of preventing a malfunction caused by overheat of the laser driver.

In addition, the laser output unit may be implemented in a variety of ways to generate a pulse laser. For example, it may be implemented in a method of a ruby laser, a neodymium: YAG laser, a neodymium: glass laser, a laser diode, an excimer laser, a dye laser or the like. For reference, in the experimental examples described below, a pulse laser is generated using the neodymium: YAG laser.

Next, the frequency controller performs a function of controlling a pulse frequency per unit time of a radiated laser. If a high state and a low state of a laser output are progressed one time respectively, this is assumed as one cycle, and the frequency controller may set how many pulse cycles will be included in a unit time, e.g., a second, and a user may control the frequency of the pulse laser through a setting process like this.

Meanwhile, the frequency of the pulse laser of the present invention may be freely controlled, preferably from 1 Hz to 50 Hz. In addition, a case in which the frequency is 0 Hz, i.e., a single shot in which a laser is output only once without cyclic repetition, may also be set.

Next, the energy controller performs a function of controlling energy intensity of a radiated laser. The energy intensity is expressed by the unit of milli-Joule (mJ), and the energy intensity in the present invention may be controlled preferably to be 40 mJ or higher.

Meanwhile, the energy controller may be implemented actually by an optical filter, and such an optical filter may include an attenuator for attenuating intensity of a pulse laser.

Next, the diameter controller is a component for adjusting the diameter of a radiated laser or accurately focusing the laser on a target point on which the laser is radiated.

The diameter controller may be implemented as a convex lens for focusing the laser on a point and a concave lens for diffusing the laser, and the laser can be focused and, at the same time, the diameter of the radiated laser can be controlled by selectively adjusting the distance between the convex lens and the concave lens.

Meanwhile, the laser radiation device 100 may further include an input unit and a display as a component for assisting convenience of handling the device by a user.

The input unit is a component for receiving input of a setting needed for driving the laser radiation device. The input unit may be implemented in a variety of input devices such as a pad, a touch screen, a mouse and the like.

Meanwhile, the display is a component for displaying an operation state and an operation result of the laser radiation device 100 or showing a user various information such as set parameters or the like of a laser. The display may display information input by the user and information to be provided to the user, in addition to a variety of menus, and may be implemented in a liquid crystal display (LCD), an OLED, a voice output device or the like.

Finally, the laser radiation device 100 further includes a control unit for controlling the laser output unit, the frequency controller, the energy controller, the diameter controller, the input unit and the display described above.

The control unit may include at least one computing means and one storage means, and, at this point, the computing means may be a general-purpose central processing unit (CPU) or may be a programmable device element (CPLD or FPGA), an application specific integrated circuit (ASIC) or a microcontroller chip implemented to be proper for a specific purpose. In addition, a volatile memory element, a non-volatile memory element or a non-volatile electromagnetic storage element may be used as the storage means.

In addition to the laser radiation device, the somatic sense induction system according to the present invention may additionally further include a lens 200 for generating air plasma. The lens 200 may gather lasers radiated from the laser radiation device at one point. Such a lens may be implemented to exist inside the laser radiation device or implemented in a form independent from the laser radiation device.

Referring to FIG. 1 again, the somatic sense induction system according to the present invention generates air plasma in the air and induce a somatic sense on a medium 300, i.e., the skin of a user, using the energy emitted from the air plasma.

The plasma is a gaseous state material separated into negatively charged electrons and positively charged ions at an ultra-high temperature. An electrical method such as direct current (DC), microwave, laser or the like is used to generate the plasma, and in the present invention, it is assumed that the plasma is generated by intensively radiating pulse lasers at one point in the air. In addition, in the present invention, it is characterized that the plasma is generated in the air, and this is referred to as air plasma in the detailed description.

At this point, the control unit may control various parameters of the laser and control strength, magnitude and duration of the plasma. The wavelength of the laser may be 1064 nm, and the energy intensity of the laser may be between 35 mJ and 65 mJ. If the intensity of the laser is less than 35 mJ, a somatic sense may not be induced or is too weak, a person may not feel the somatic sense, and if the intensity of the laser exceeds 65 mJ, it may be harmful to a human body. Particularly, if the intensity of the laser is higher than 68 mJ, it may do a direct harm to the human body.

Meanwhile, energy is emitted from the air plasma generated like this in two forms of a shock wave and an electric field.

The shock wave refers to a strong pressure wave transferred through a fluid at a speed faster than the speed of sound, in which wave fronts are generated to be overlapped due to the abrupt change of pressure, and the pressure, density, speed and the like increase when the shock wave passes through. That is, the energy emitted from the air plasma is rapidly transferred to a fluid in the neighborhood, i.e., the air, and since overlapped areas are repetitively generated in the air due to the transferred energy, the energy can be transferred to the outside.

On the other hand, the electric field refers to a field generated in a space around electric charges having electricity, and a charged object receives an electric force and changes its state within the electric field. Since the air plasma itself is a gas charged with electricity, an electric field is generated around the air plasma, and in the present invention, a state change is induced in the medium 300 using the electric field.

Hereinafter, a somatic sense induction method using air plasma according to the present invention will be described with reference to FIGS. 2 and 3.

Figure 2:
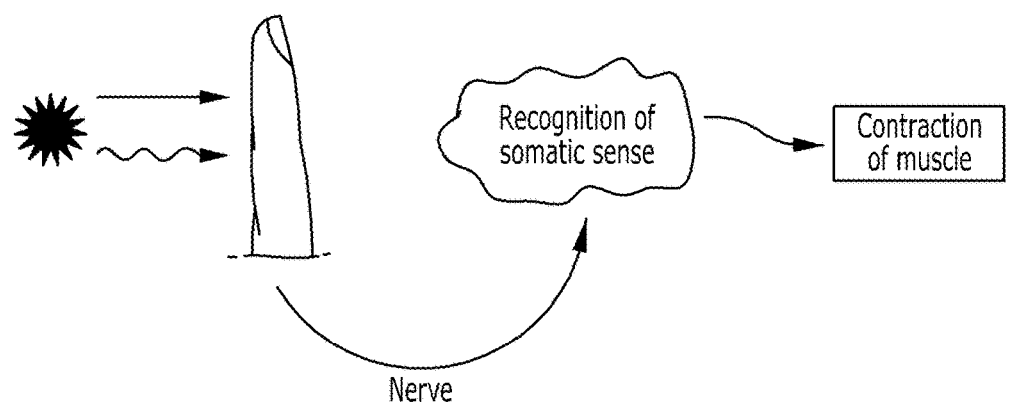
FIGS. 2 and 3 are views showing the process of recognizing a somatic sense by a user using a somatic sense induction system according to the present invention.

FIG. 2 is a view schematically showing the process of transferring the energy of a shock wave and an electric field to the skin of a user when the shock wave and the electric field are emitted from air plasma and transferring a state change in the skin to the brain through nerves if the transferred energy generates the state change so that a specific somatic sense may be recognized as a result.

Figure 3:
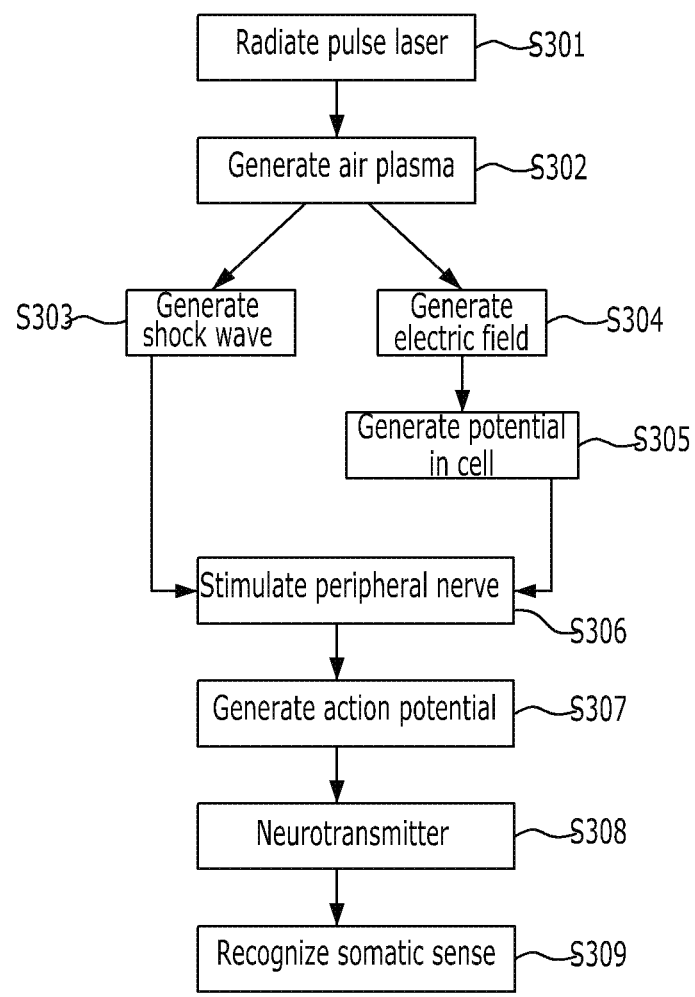

FIG. 3 is a view showing the process of FIG. 2 in steps following a sequence. According to FIG. 3, a somatic sense induction method using air plasma starts from a step of radiating a pulse laser (step S301). The pulse laser is radiated by the laser radiation device mentioned in the description of FIG. 1, and a step of setting parameters of the laser may be further included before the step S301. The step of setting parameters of the laser means a step of receiving an input from the user by the laser radiation device and setting parameters of the laser which will be radiated in the air according to the input.

After the step S301, the radiated pulse laser generates air plasma in the air (step S302), and the air plasma generated like this generates a shock wave and an electric field toward the outside (steps S303 and S304).

The generated shock wave arrives at a medium, i.e., as far as the skin of the user, and stimulates a cell configuring the skin, and this means stimulating peripheral nerves in the cell (step S306), and the steps of generating an action potential (step S307), activating neurotransmitters (step S308) and recognizing a somatic sense by the brain (step S309) are followed according thereto.

Meanwhile, the electric field generated by the air plasma affects a cell configuring the skin of the user, and at this point, the electric field generates a potential difference in the cell (step S305) and stimulates peripheral nerves in the cell (step S306). The steps of S306 to S309, from the step of stimulating peripheral nerves to the step of recognizing a somatic sense by the brain, are the same as the steps of the shock wave described above.

Figure 4:
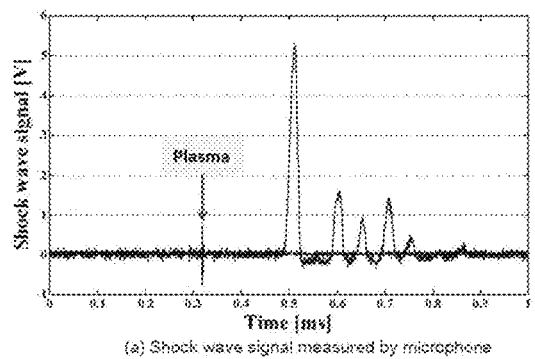
FIG. 4 is a view showing a result of measuring shock waves using a microphone.
Figure 4:
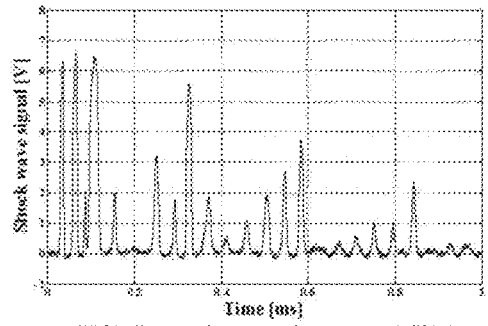
Figure 4:
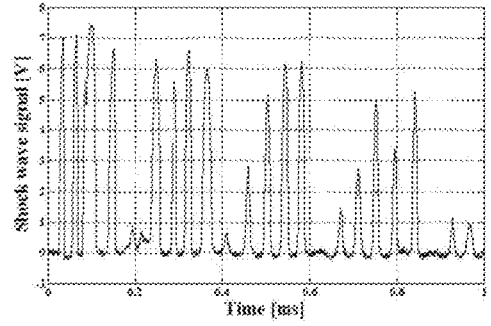

FIG. 4 is a view showing a result of measuring shock waves generated by air plasma.

FIG. 4(a) is a view showing a result of measuring a shock wave sensed by a microphone and converting the shock wave into a voltage signal after providing the microphone at a certain point within a radius of 50 mm from a point where air plasma is generated. According to this, it can be confirmed that after the air plasma is generated at the time point of 0.3 ms, a voltage signal of a predetermined magnitude is repetitively sensed from the time point of 0.5 ms, and such a result of the experiment can be regarded as confirming that shock waves generated by air plasma continuously arrive at the microphone at regular time intervals. Furthermore, seeing FIG. 4(a), it can be also confirmed that strength of the shock waves generated by the air plasma is weakened over time.

Meanwhile, it can be estimated that as the energy intensity of a laser increases, magnitude of the shock wave generated by the air plasma also increases in proportion to the energy intensity, and a result of an experiment conducted to confirm this is shown in FIGS. 4(b) and (c). That is, it is understood that if air plasma is generated by setting energy intensity among the parameters of the laser to 32 mJ and 60 mJ respectively, strength of the shock waves sensed by the microphone increases as the energy intensity of the laser increases, as shown in FIGS. 4(b) and (c).

Figure 5:
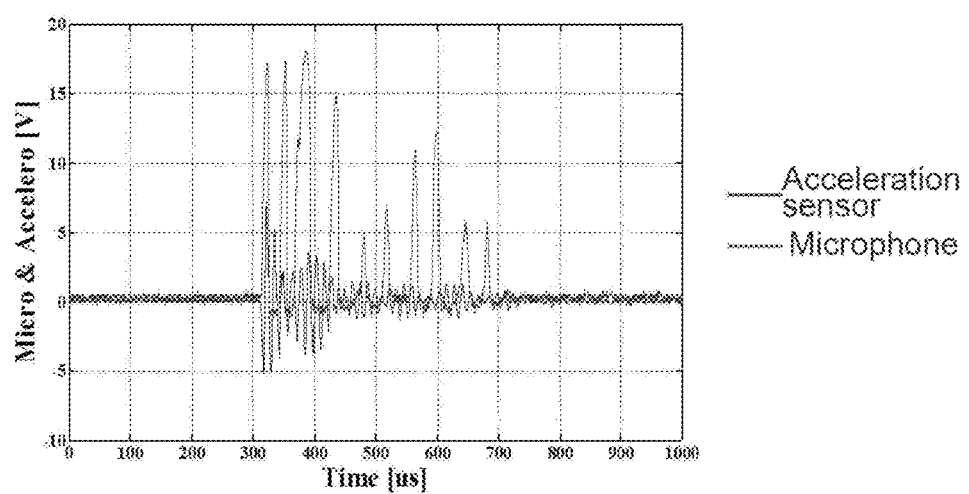
FIG. 5 is a view showing a result of measuring shock waves using an acceleration sensor.

Meanwhile, the shock wave generated by the air plasma can be measured using an acceleration sensor, as well as the microphone. FIG. 5 is a view showing a result of comparing shock waves measured using an acceleration sensor and a microphone. Seeing the figure, it can be confirmed that although the magnitude of the voltage signal of the shock wave measured by the acceleration sensor has a value comparatively smaller than that of the voltage signal of the shock wave measured by the microphone, the resulting values show similar patterns.

Meanwhile, in the somatic sense induction method according to the present invention, since the shock wave and the electric field generated by the air plasma may affect in all directions from the position where the air plasma is generated, a somatic sense may be induced regardless of direction if a medium maintains only a distance of a predetermined level or lower from the center of the air plasma. In other words, the shock wave and the electric field generated by the air plasma may induce a state change in a medium existing at a certain point inside a virtual sphere around a position where the air plasma is generated.

Figure 6:
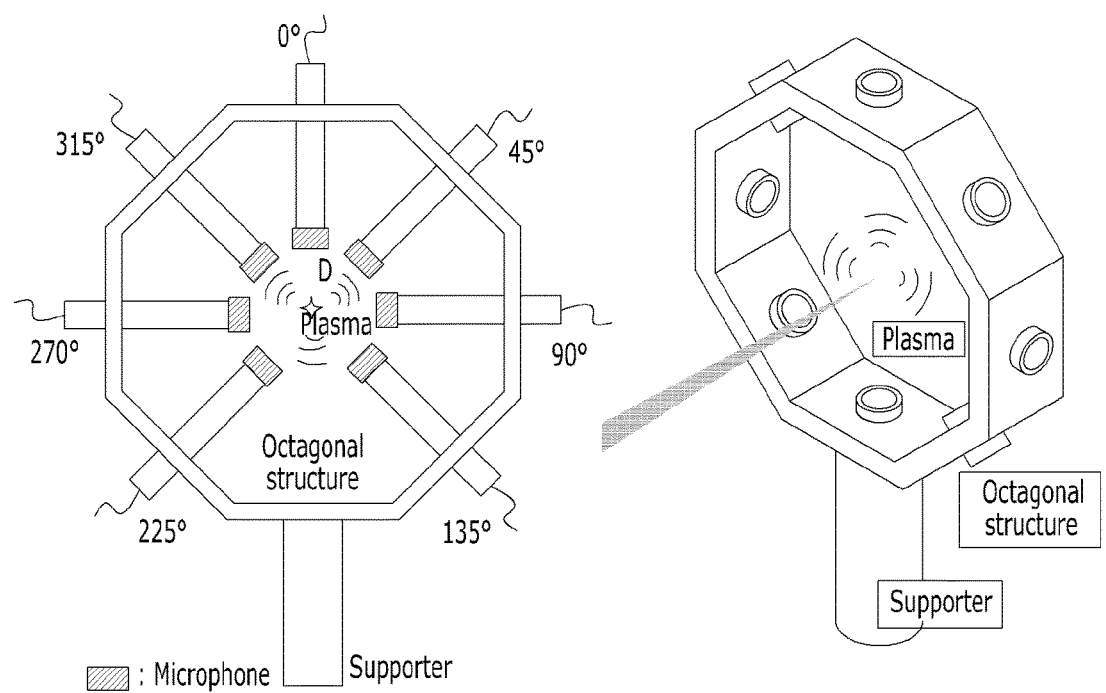
FIG. 6 is a view showing an experiment environment for measuring shock waves in an area close to air plasma.

FIG. 6 is a view showing an experiment environment for confirming a characteristic like this. The experiment environment is configured by providing an octagonal frame around a point where the air plasma is generated and then installing microphones at all sides except the bottom side. At this point, the microphones are installed to be spaced apart from the center by the same distance.

Figure 7:
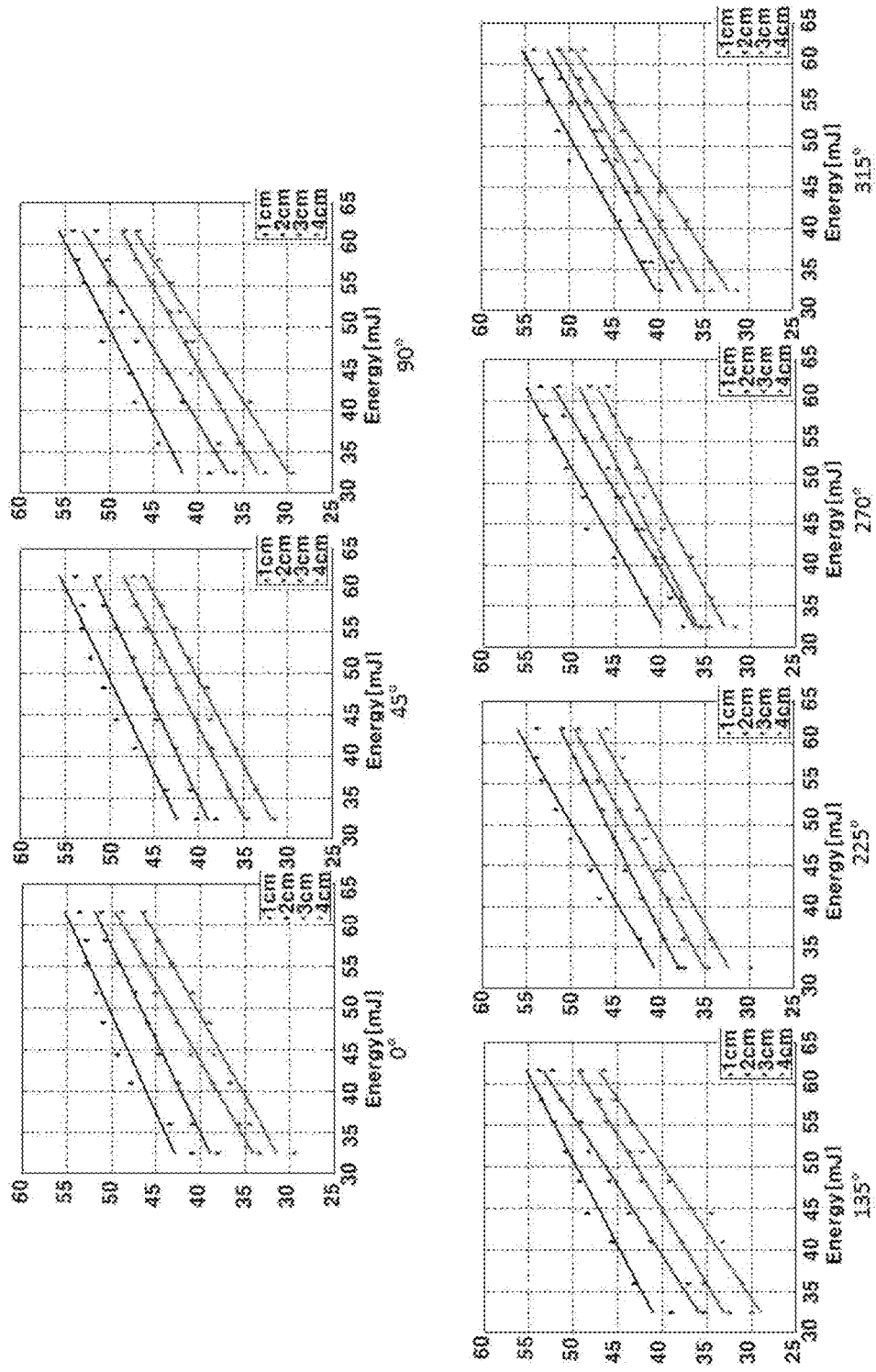
FIG. 7 is a view showing a result measured through a microphone in the experiment environment of FIG. 6.

FIG. 7 is a view showing a result measured in the experiment of FIG. 6, and each of the graphs of FIG. 7 shows strength of shock waves measured in all directions in the form of magnitude of a voltage signal. As is shown in the graphs, the shock waves are measured in all directions, and particularly, a further stronger shock wave is measured in each direction as the magnitude of the energy of the laser is the larger, and a further stronger shock wave is measured as the microphone is further closer to the center.

Figure 8:
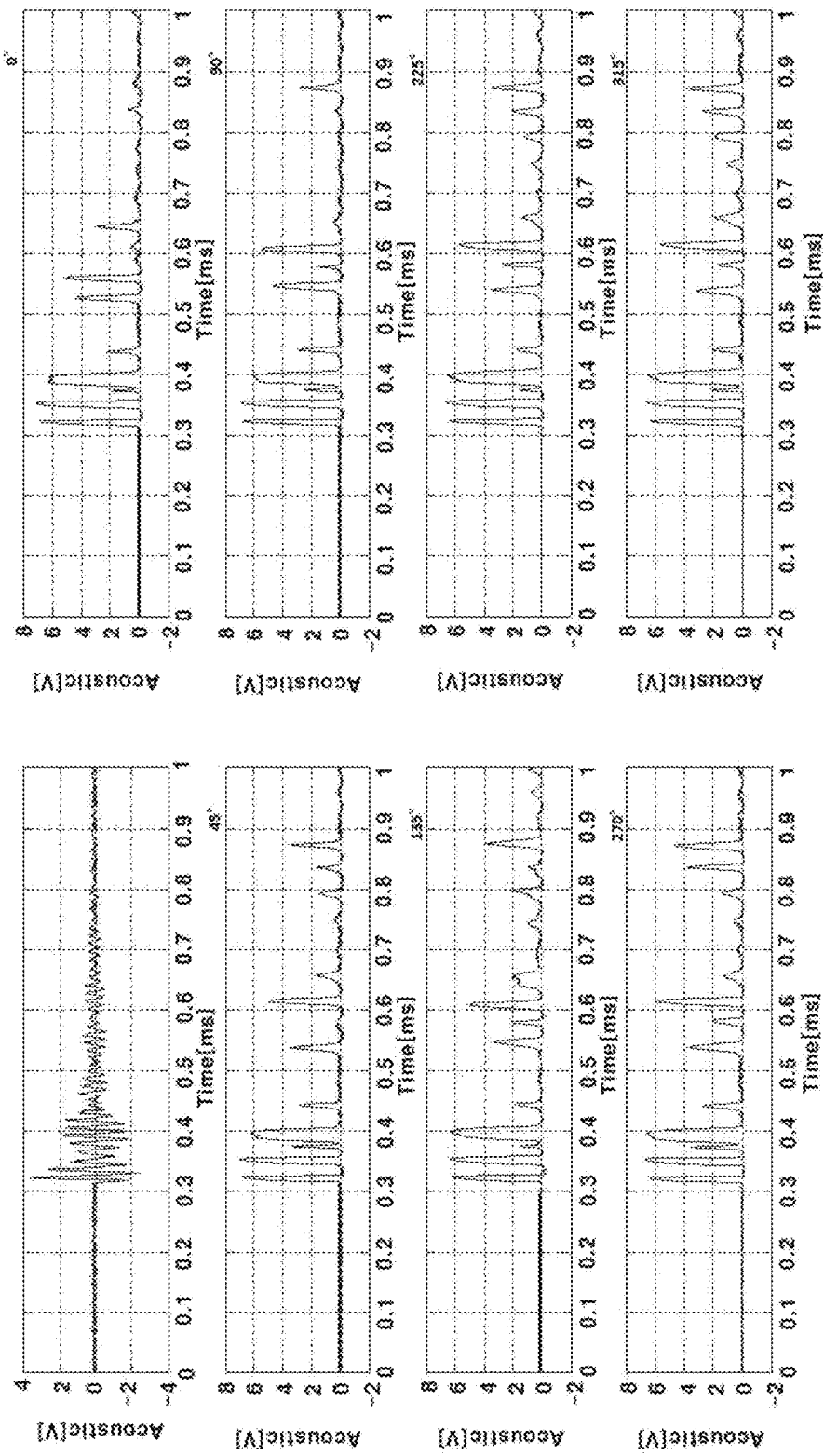
FIG. 8 is a view showing a result measured through an acceleration sensor in the experiment environment of FIG. 6.

Meanwhile, FIG. 8 is a view showing strength of shock waves measured after replacing the microphones with acceleration sensors in the experiment environment of FIG. 6, and seeing the graphs shown in FIG. 8, it is understood that shock waves of all directions affect the acceleration sensors in a similar pattern.

Figure 9:
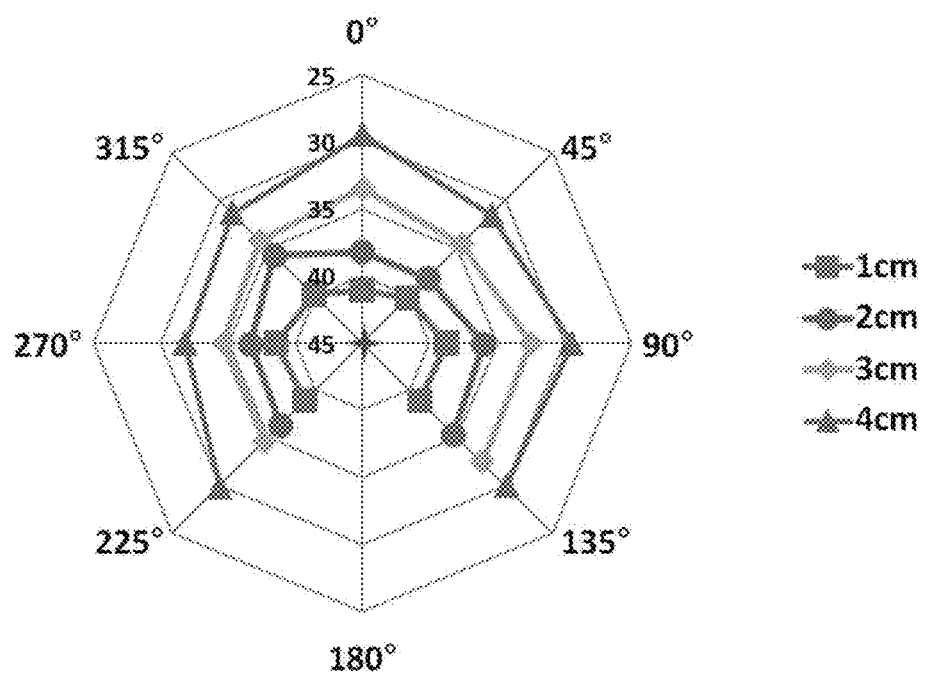
FIG. 9 is a view showing distribution of strength of the shock waves measured in the experiment environment of FIG. 6.

On the other hand, FIG. 9 is a view showing distribution of strength of shock waves according to the distance of the shock wave measured in each direction. As is already confirmed from the result of the experiment of FIG. 7, strength of a shock wave is inverse proportion to the distance to the air plasma, and according to FIG. 9, it is understood that strength of a shock wave is measured to be further stronger as the distance to the air plasma is the shorter.

From the results of the experiments shown in FIGS. 7 to 9, it is understood that a shock wave generated by the air plasma may affect in all directions, and it can be inferred that a somatic sense may be induced to a medium, i.e., the skin of a human body, positioned at a certain point, and, furthermore, a degree of the somatic sense, i.e., the strength of a tactile sense, that can be sensed may vary according to the distance to the air plasma.

Figure 10:
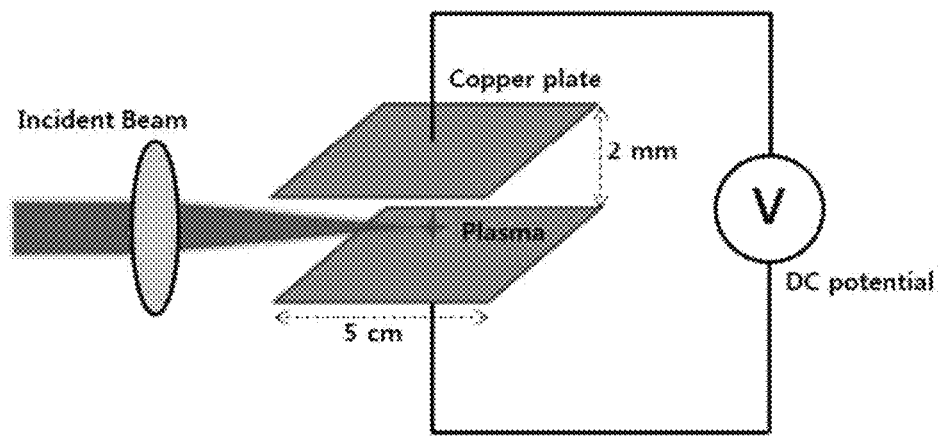
FIG. 10 is a view showing an experiment environment for measuring an electric field.

Meanwhile, FIG. 10 is a view showing an experiment environment for measuring an electric field generated by the air plasma. The experiment environment is configured by providing electrode plates above and below a point where the air plasma is generated and connecting the electrode plates using a wire, in which the electrode plates are connected to a voltmeter in series.

Figure 11:
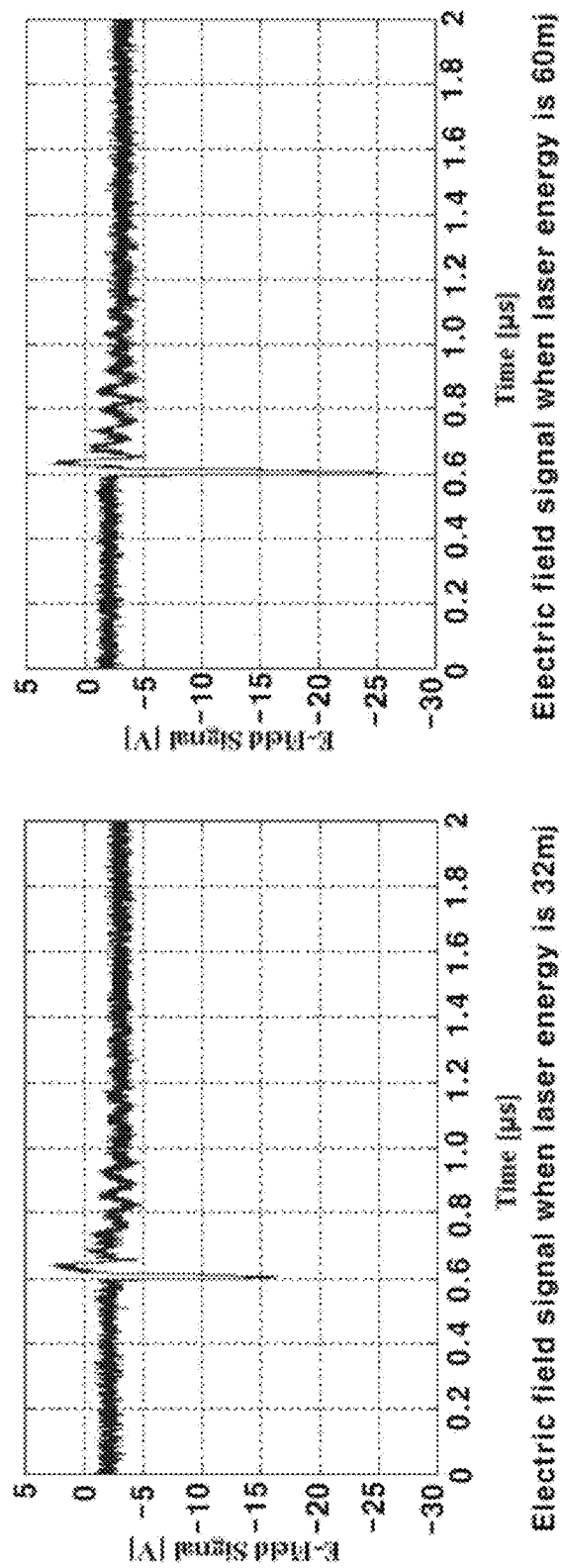
FIG. 11 is a view showing electric fields measured according to energy intensity of a laser.

FIG. 11 is a view showing voltage signals of electric fields as a graph, in which the electric fields are measured when the energy intensity of a laser is 32 mJ and 60 mJ, and according to the figure, it is understood that the peak-to-peak voltage is measured to be about 20V in the environment of 32 mJ and about 30V in the environment of 60 mJ. That is, it is understood that strength of an electric field generated by air plasma is further stronger as the energy of a laser has a larger value.

Figure 12:
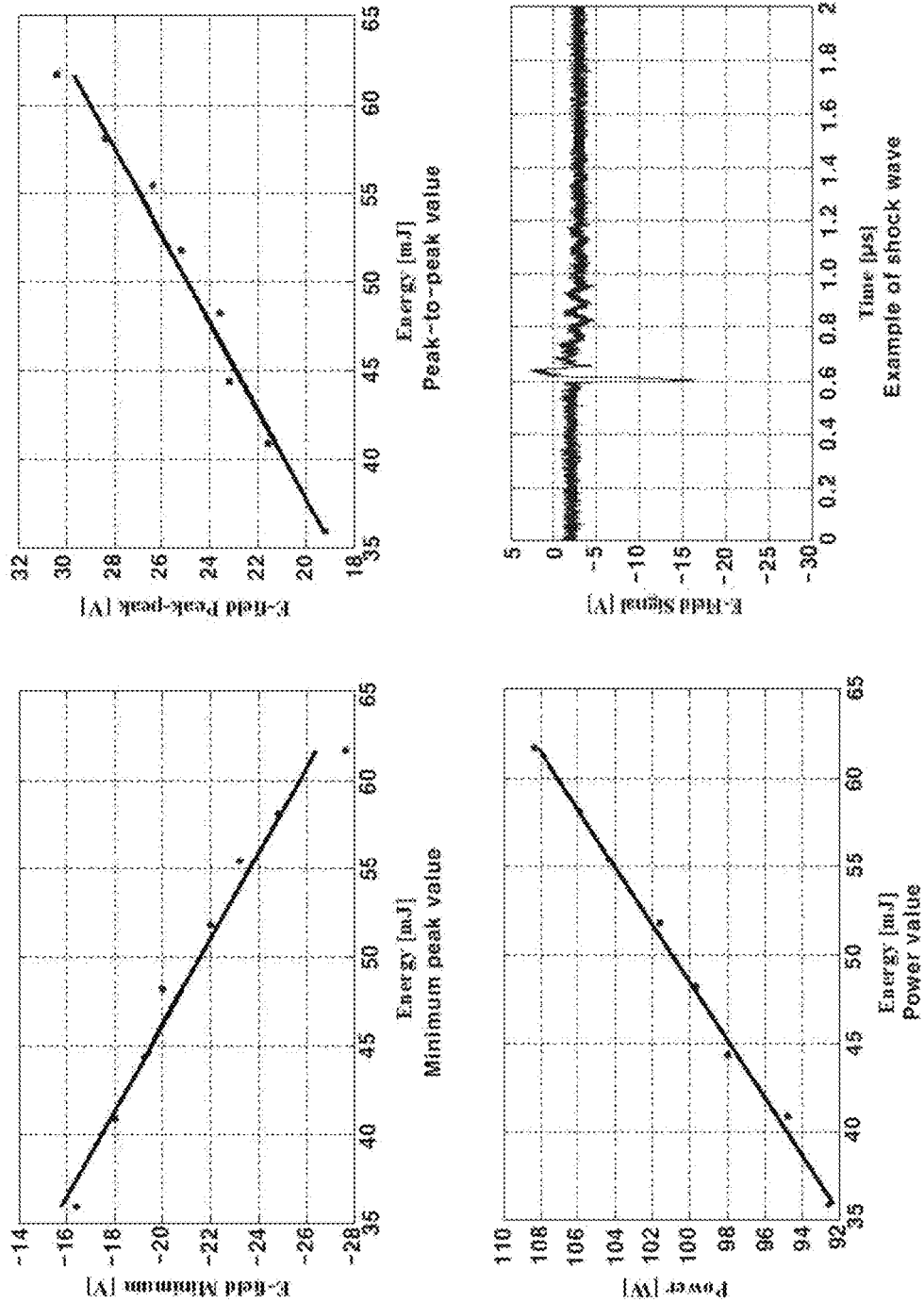
FIGS. 12 and 13 are views showing results of measurement of electric fields observed while changing parameters of a laser.

FIG. 12 is a view showing a result of measuring a minimum peak value, a peak-to-peak value and a power value of a voltage signal of an electric field measured by changing energy intensity of a laser, i.e., magnitude of plasma energy, while maintaining the voltage (DC potential) of FIG. 10 to be constant. It can be confirmed that the peak-to-peak value and the power value increase in proportion to increase of the value of the energy intensity, and although the minimum peak value continuously decreases in the graph, this eventually shows increase of potential difference, and thus as a result, all the three graphs show that strength of an electric field becomes stronger as the energy of the laser increases.

Figure 13:
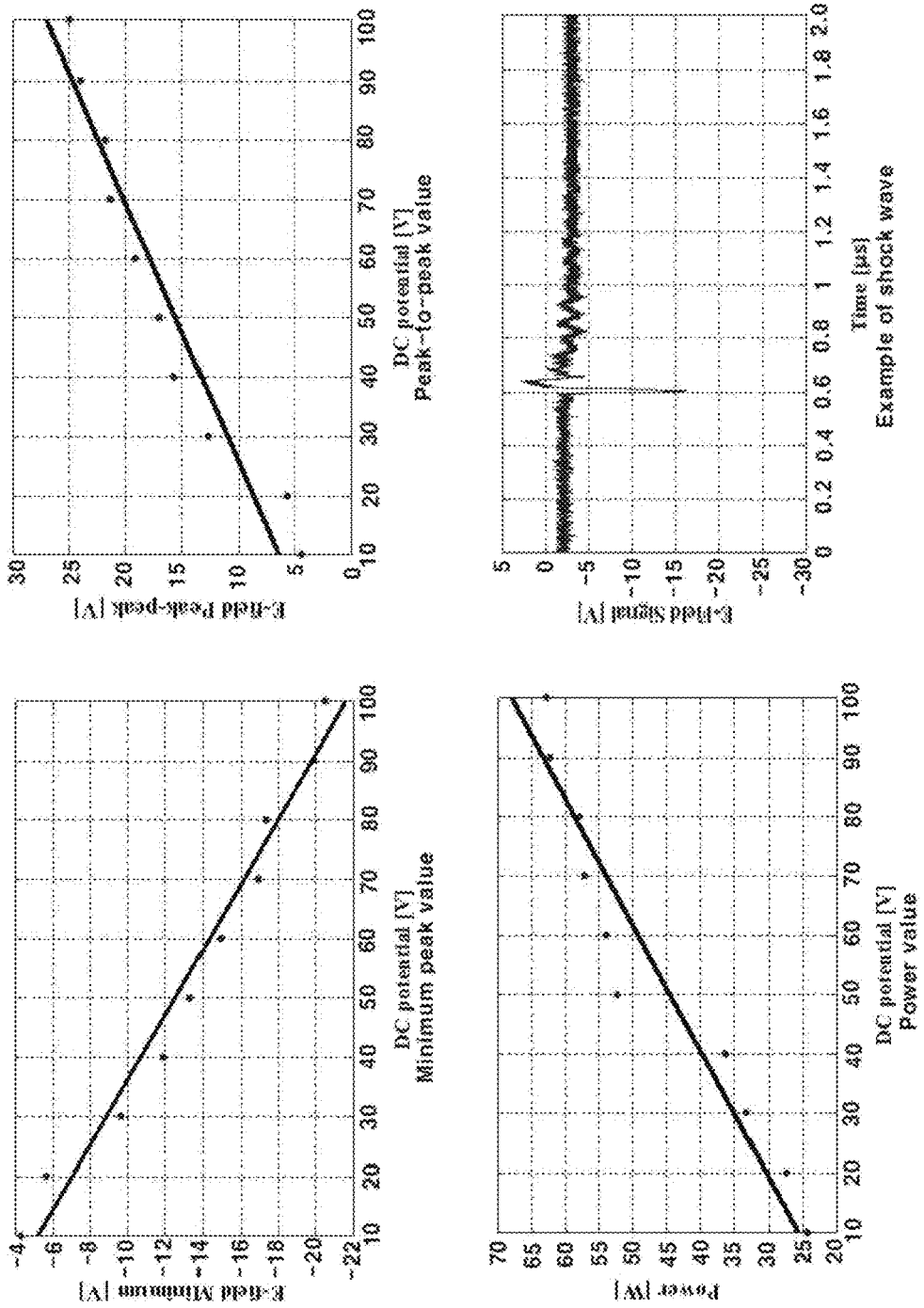

FIG. 13 is a view showing voltage signals of an electric field measured while magnitude of potential changes. Specifically, FIG. 13 is a view confirming an electric field measured when the energy generated by air plasma as shown in FIG. 10 is maintained to be constant and the voltage (DC potential) applied to the electrode plates (copper plates) is changed. This is a data which can infer that when the air plasma is used for a human being in the future, i.e., when the skin has a potential of a predetermined magnitude and plasma is generated around the skin, a tactile sense is induced, and various tactile senses can be induced by adjusting the frequency and size of the plasma.

Observing the figure, to be similar to the result of FIG. 12, it also shows that the minimum peak value linearly decreases and the peak-to-peak value and the power value increase as the potential, i.e., the potential difference between the electrode plates, increases.

Figure 14:
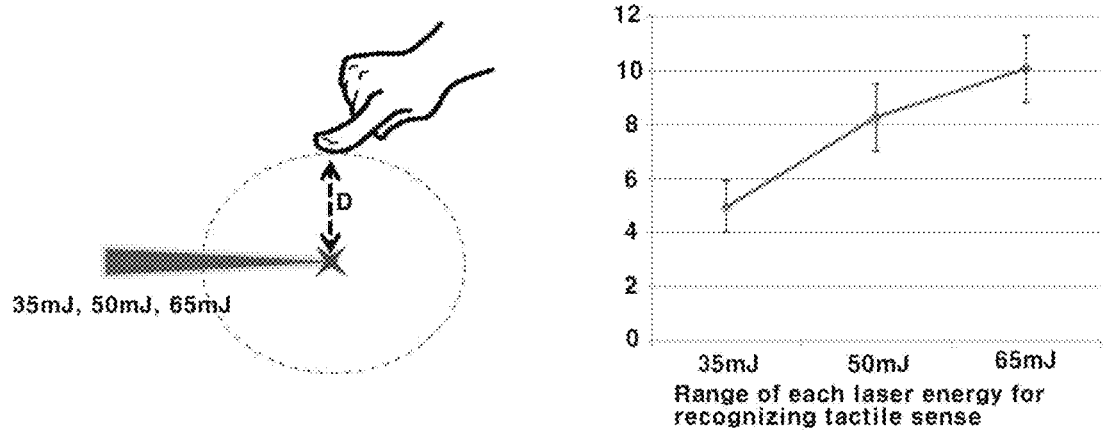
FIG. 14 is a view showing a result of an experiment conducted to conform whether or not a user recognizes a somatic sense according to a distance from air plasma.

FIG. 14 is a view showing a result of an experiment conducted to measure a range of a somatic sense that a person may feel according to a value of energy intensity of a laser.

Referring to the figure, whether or not a plurality of experiment subjects may feel a somatic sense, i.e., a tactile sense, according to a distance from air plasma is monitored and a result is calculated, and the experiment has been conducted in a method of positioning a finger of experiment subjects to be spaced apart from the air plasma at intervals of 1 mm and answering whether or not a tactile sense is felt.

Observing the figure, it can be confirmed that a tactile sense can be felt as far as a point 5 mm away in average when the energy intensity of the laser is 35 mJ, as far as a point about 8 mm away when the strength is 50 mJ, and as far as a point about 10 mm away when the strength is 65 mJ.

That is, it is understood that the shock wave and the electric field may affect as far as a further wider area as the strength of the laser is the stronger, and this also means that an area which may affect a medium can be adjusted by controlling the strength of the laser.

Figure 15:
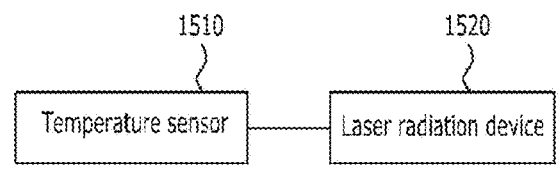
FIG. 15 is a view showing an example of using a laser radiation device to warn a danger as an embodiment of the present invention.

FIG. 15 is a view showing an example of using a laser radiation device to warn a danger as an embodiment of the present invention.

Referring to FIG. 15, a somatic sense induction system for informing a danger may include a temperature sensor 1510 and a laser radiation device 1520.

The temperature sensor 1510 is arranged around a heating element of an electric device and continuously senses temperature of the heating element if the electric device is turned on. Even when the electric device is turned off, the temperature sensor 1510 may continue to sense the temperature until the temperature of the heating element drops below a preset temperature.

The laser radiation device 1520 receives a value of the temperature sensed by the temperature sensor 1510 and generates air plasma in a space above an electric range if the received temperature is higher than a preset temperature. The air plasma may induce a somatic sense on the skin of a user.

Figure 16:
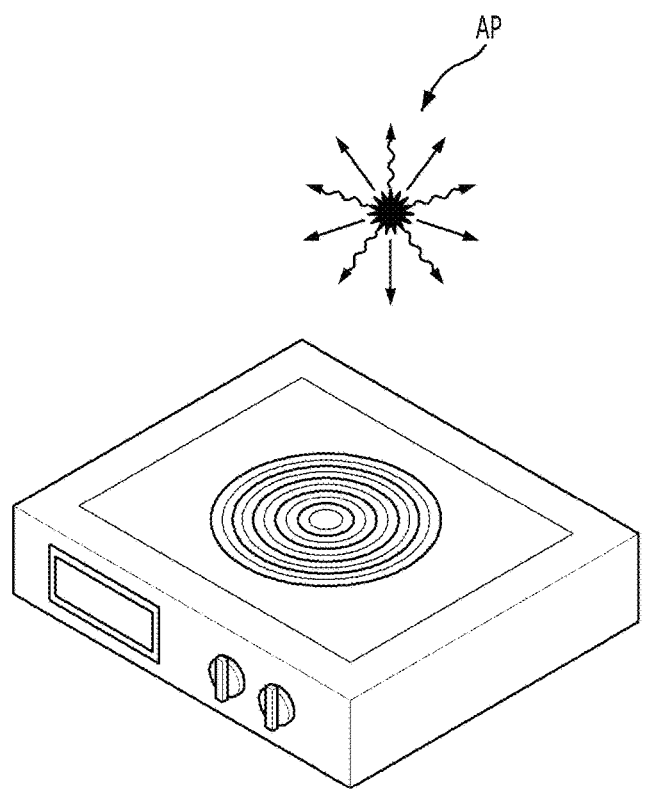
FIG. 16 is a view showing an example of air plasma generated above an electric range.

FIG. 16 is a view showing an example of air plasma generated above an electric range.

If air plasma is generated at a point spaced apart from the top of an electric range by a predetermined distance as shown in FIG. 16, safety accidents can be prevented in advance since visibility is further excellent than mounting a heating element in the electric range.

Although a user does not see the air plasma generated above the electric range and approaches near the heating element of the electric range, the user may recognize a danger more directly since a somatic sense is induced by a shock wave and an electric field if the skin approaches the heating element, and thus accidents can be prevented in advance.

Although an electric range is shown as an example in this embodiment, the somatic sense induction system may be applied to a variety of electric devices having a heating element, such as an electric pot, an electric heater and the like.

Figure 17:
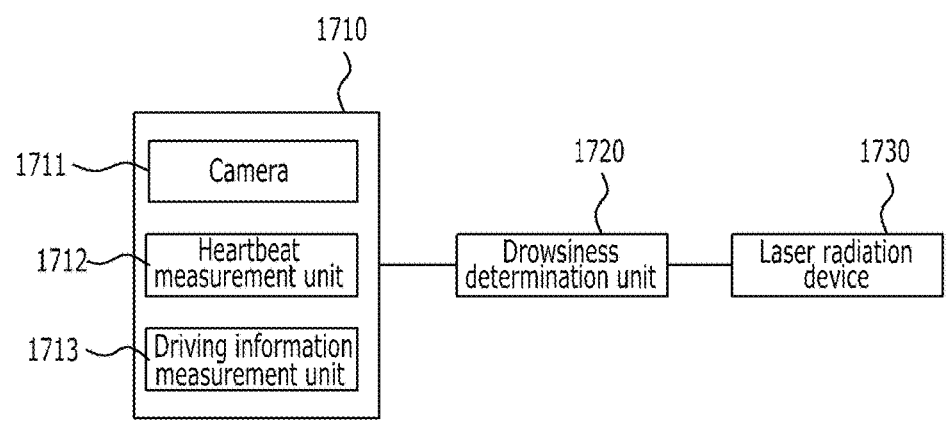
FIG. 17 is a view showing an example of using a somatic sense induction system to prevent drowsiness of a driver as another embodiment of the present invention.

FIG. 17 is a view showing an example of using the somatic sense induction system to prevent drowsiness of a driver as another embodiment of the present invention.

Referring to FIG. 17, a somatic sense induction system for preventing drowsiness may include an information collection unit 1710, a drowsiness determination unit 1720 and a laser radiation device 1730. In addition, as shown in FIG. 1, the somatic sense induction system may further include a lens 200.

The information collection unit 1710 is a part for collecting biological information of a driver and driving information of a vehicle and may include a camera 1711, a heartbeat measurement unit 1712 and a driving information measurement unit 1713. The information collection unit 1710 may include all of these three components, or some of the components may be omitted as needed.

The camera 1711 is installed inside a vehicle to photograph a face of a driver to the drowsiness determination unit 1720. The camera 1711 may be arranged at a position appropriate for photographing the face and the eyes of the driver. For example, it can be arranged at a position such as the steering wheel or the frame of the windshield.

The heartbeat measurement unit 1712 detects a heartbeat (pulse) rate of the driver and transmits a heartbeat signal corresponding to the detected heartbeat rate to the drowsiness determination unit 1720. The heartbeat measurement unit 1712 may be configured in a wearable form or a form mounted on a vehicle. For example, the heartbeat measurement unit 1712 may include a plurality of electrodes installed on the steering wheel. When the right and left hands of the driver contact with the electrodes, a potential difference corresponding to the cardiac potential of the driver occurs between the two electrodes, and the heartbeat measurement unit 1712 may acquire a heartbeat signal of the driver by detecting the potential difference occurred between the two electrodes.

Alternatively, a pulse wave sensor of a form such as a wristwatch, a ring or the like may be mounted on the driver to detect a heartbeat signal (a signal corresponding to the heartbeat signal).

The driving information measurement unit 1713 measures a driving state of the vehicle using various sensors (a steering sensor, a torque sensor and the like) installed in the vehicle and transmits a result thereof to the drowsiness determination unit 1720. For example, the driving information measurement unit 1713 measures a steering angle (a steering degree) and a lateral position of the vehicle and transmits a signal informing the driving state of the vehicle (a vehicle signal) to the drowsiness determination unit 1720.

The drowsiness determination unit 1720 receives various information about the state of the driver and the vehicle from the information collection unit 1710 and determines whether the driver is in a drowsy state.

For example, when a photographed image is received from the camera 1711, the drowsiness determination unit 1720 may determine a drowsy state of the driver by analyzing the image of the pupils of the driver. The drowsiness determination unit 1720 detects an area of a pupil of the driver using the Haar-like feature from the face of the photographed driver, enhances a determination rate of the detected area of the pupil using the AdaBoost learning algorithm, and determines drowsy driving based on the size and roundness of the pupil by binarizing the detected pupil and determining symmetricity of the pupil. If the circumference or area of the detected pupil is smaller than a preset circumference or area of a pupil, it can be determined as a drowsy state.

In addition, the drowsiness determination unit 1720 may determine drowsiness by using heartbeat measurement information. For example, if the heartbeat rate of the driver drops below a predetermined level, it can be determined as a drowsy state.

In addition, the drowsiness determination unit 1720 may determine drowsiness by using a vehicle state signal. For example, if a vehicle does not normally drive and drives in a zigzag pattern or does not drive in a normal lane and drives across two lanes, it can be determined as a drowsy state.

The drowsiness determination unit 1720 as described above determines drowsiness of a driver based on the biological information of the driver and the state information of the vehicle and transmits a result of the determination to the laser radiation device 1730.

The laser radiation device 1730 receives a signal corresponding to drowsiness of the driver and generates air plasma by radiating a laser when a drowsy signal is received. The air plasma may induce a somatic sense on the skin of the user.

Figure 18:
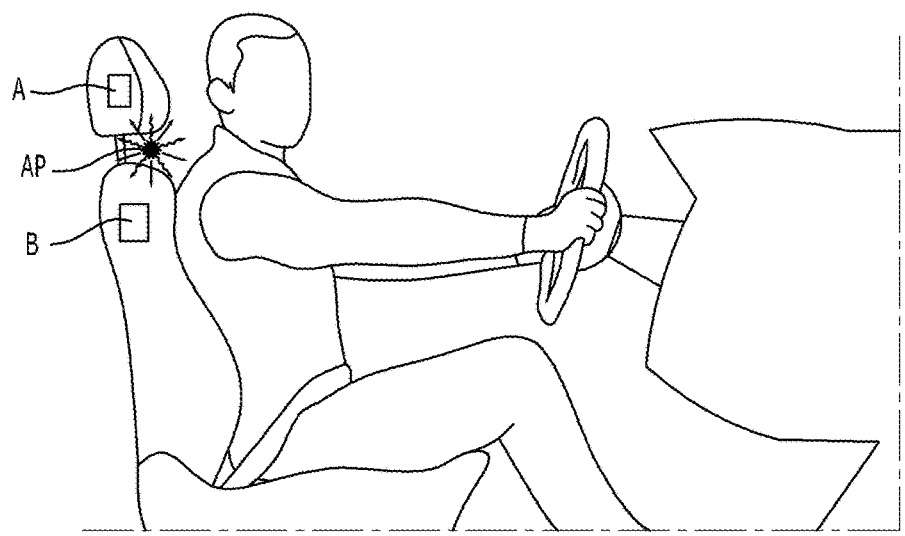
FIG. 18 is a view showing an example of arranging a laser radiation device 100 on a seat of a vehicle.

FIG. 18 is a view showing an example of arranging a laser radiation device on a seat of a vehicle. As shown in FIG. 18, the laser radiation device may be installed inside the headrest A or inside the backrest B of a seat of a vehicle to generate air plasma AP in an empty space between the headrest and the backrest. If the air plasma AP is generated, a somatic sense may be induced to the driver staying within a predetermined distance from the air plasma. Accordingly, if it is determined that the driver is in a drowsy state, drowsiness of the driver can be prevented by generating the air plasma.

Figure 19:
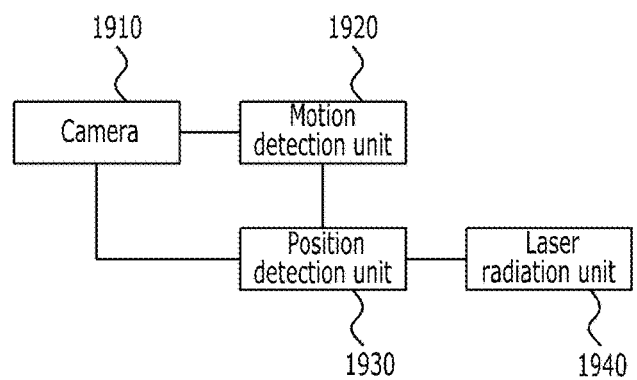
FIG. 19 is a view showing an example of applying a somatic sense induction system to a game console as another embodiment of the present invention.

FIG. 19 is a view showing an example of applying a somatic sense induction system to a game console as another embodiment of the present invention.

Referring to FIG. 19, a somatic sense induction system may include a camera 1910, a motion detection unit 1920, a position detection unit 1930 and a laser radiation unit 1940.

The camera 1910 photographs a game user, i.e., a user, and transmits an image of the user to the motion detection unit 1920. Two or more cameras may be configured and used to measure the depth of an image or analyze a distance to a subject.

The motion detection unit 1920 may receive an image from the camera 1910 and detect a motion of the user by analyzing the image. Although the motion detection unit 1920 may detect an overall motion of the user, it may set a region of interest in advance and detect only a motion related to the region of interest. For example, in the case of a sport game such as volleyball, since a part of a body hitting a ball is a hand although the whole body moves, an area around the hand may be set as a region of interest, and only a motion in the region of interest may be detected to be used as an input signal of the game.

That is, the motion detection unit 1920 may detect a motion in a region of interest and transfer motion information to a game control unit (not shown), and the game control unit may receive the motion information and control to execute a game using the motion information as an input signal. The motion detection unit 1920 may detect a region of motion from the image of the user and acquire motion information about how fast the user moves in which direction by recognizing the position, direction, variation, time and the like of the detected region of motion. At this point, the acquired motion information may include a direction, a speed and the like of the user moving to play the game, and the direction, the speed and the like may be transferred to the game control unit so that the user may play the game using the motion as an input signal. Since the game control unit is the same as a general technique of sensing a motion and using the motion as an input signal, detailed description thereof will be omitted.

In addition, if there is a plurality of game users, the motion detection unit 1920 may select a motion that can be used as an input signal among the motions of the plurality of game users. For example, if there are motions of hitting and blocking a ball using a hand in a volleyball game, the motion detection unit 1920 may select a motion of hitting the ball as a motion in the region of interest and transmit information on the motion to the game control unit and the air plasma generation unit.

The position detection unit 1930 may receive the image of the camera and information on the region of motion and detect a position where a motion is generated. The position detection unit 1930 may acquire a stereoscopic image by using two or more cameras, grasp an approximate position of the user by analyzing the image, and grasp a position of a motion by grasping the region of motion detected by the motion detection unit 1920. Various publicized methods other than this may be used as a method of detection. For example, a position of the user may be detected by attaching an ultrasonic sensor (not shown).

In addition, if there is a plurality of game users, the position detection unit 1930 may detect a position where a motion, which can be used as an input signal of a game, is generated among the motions of the plurality of game users. The position detection unit 1930 may receive motion information which will be used as an input signal in the motion detection unit 1920 and detect a position where the motion is generated. For example, if there are motions of hitting and blocking a ball using a hand in a volleyball game, the position detection unit 1930 may detect a position of a user performing the motion of hitting the ball, detect a position of an area where the hitting takes place, and transmit the positions to the laser radiation device 1940.

The laser radiation device 1940 may induce a somatic sense of the user by generating air plasma around the region of motion detected by the motion detection unit.

Figure 20:
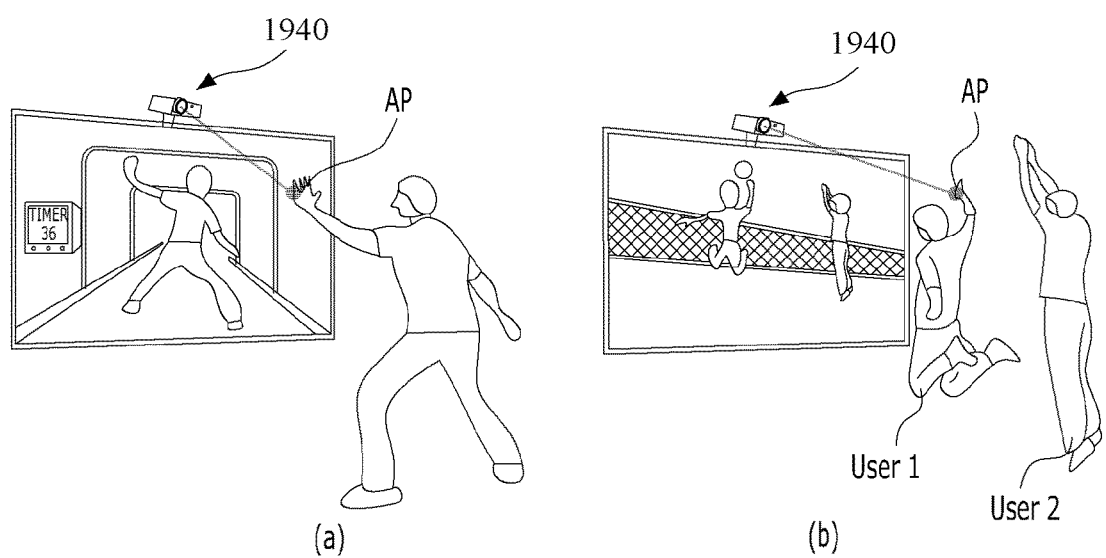
FIG. 20 is a view showing an example of mounting an air plasma generation device according to an embodiment of the present invention.

FIG. 20 is a view showing an example of mounting an air plasma generation device according to an embodiment of the present invention. FIG. 20(*a*) is a view showing a case in which there is one game user, and FIG. 20(*b*) is a view showing a case in which there are two game users.

Referring to FIG. 20, it can be confirmed that the laser radiation device 100 is arranged on the top of a display device. As shown in the figure, a camera, a motion detection unit and an air plasma generation unit may be configured in one body in the laser radiation device 100 or may be configured to be separate from each other.

If the camera 1910 photographs a motion of a user, the motion detection unit 1920 recognizes the motion, and the laser radiation device 1940 generates air plasma around the region of motion.

In the case of a sport game such as volleyball, a region of a hand of a user is detected, and air plasma is generated around the region of the hand of the user.

At this point, if a position of the hand of the user is detected inaccurately and air plasma is generated only within a predetermined distance around the region of a hand, a somatic sense of the user is induced, and the user may feel a tactile sense.

In addition, as shown in FIG. 20(*b*), if there are a first user USER1 and a second user USER2, the motion detection unit 1920 may detect all the motions of the two users, and air plasma may be generated in an area around the region of motion of the first user USER1 performing a motion of hitting a target.

Although a volleyball game is shown in this embodiment as an example, other than this, the somatic sense induction system may be applied to a variety of games which need a tactile sense.

Figure 21:
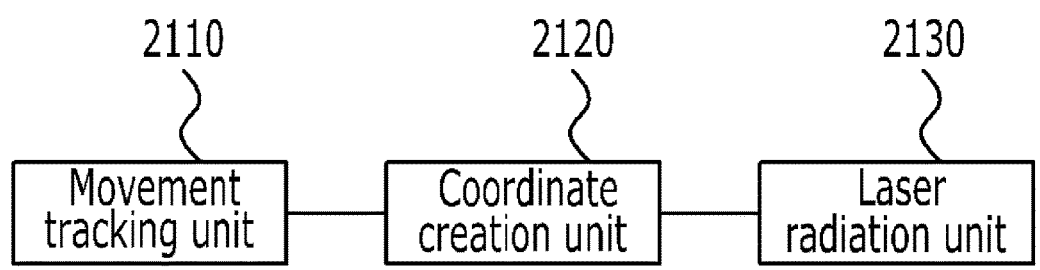
FIG. 21 is a view showing an example of using a somatic sense induction system to display a stereoscopic image as another embodiment of the present invention.

FIG. 21 is a view showing an example of using a somatic sense induction system to display a stereoscopic image as another embodiment of the present invention.

Referring to FIG. 21, a somatic sense induction system may include a movement tracking unit 2110, a coordinate creation unit 2120 and a laser radiation unit 2130.

The movement tracking unit 2110 is a unit for tracking movement of a subject, which can detect the movement by radiating light on the subject and receiving the light reflected from the subject. For example, if a photo detector such as an image sensor is used, the movement tracking unit 2110 may detect pixels which receive the reflected light from a pixel array included in the image sensor and track movement of the subject based on the movement of the position of the detected pixels. The image sensor may be a CMOS image sensor (CIS) or a sensor configured of a two-dimensional Position Sensitive Detector (2D-PSD) or a two-dimensional Photo Diode (2D-PD). The subject may be a finger of a lecturer.

The coordinate creation unit 2120 creates three-dimensional spatial coordinates corresponding to the movement of the subject. If movement of the subject is detected, the coordinate creation unit 2120 may create three-dimensional coordinates corresponding to a region of movement in a real space. Since the subject moves in a three-dimensional space, it can be expressed on an x-, y- and z-axis, which are three-dimensional coordinate axes, and thus the coordinate creation unit 2120 may receive movement tracking information from the movement tracking unit 2110 and create three-dimensional coordinates corresponding to the movement tracking information.

The laser radiation unit 2130 may receive the three-dimensional coordinates from the coordinate creation unit 2120 and generate air plasma by radiating a laser at the received coordinates. The air plasma may last as long as a preset time and form a three-dimensional image according to the movement of the subject. In addition, the air plasma may induce a somatic sense on the skin of the user. The somatic sense will be described below.

Figure 22:
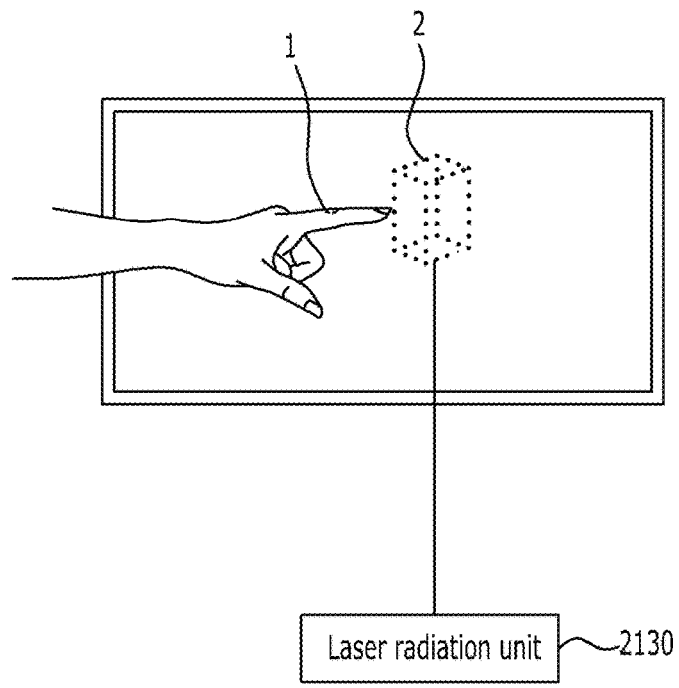
FIG. 22 is a view showing an example of generating air plasma by tracking movement of a finger using a laser radiation device 2110 according to an embodiment of the present invention.

FIG. 22 is a view showing an example of generating air plasma by tracking movement of a finger using a laser radiation device 2110 according to an embodiment of the present invention.

Referring to FIG. 22, a laser radiation device 2130 may track movement of a subject 1 and create an image 2 of a specific shape in a space by radiating a laser according to the movement of the subject. At this point, duration of the image 2 may be adjusted by controlling parameters of the laser. Accordingly, a three-dimensional figure of a complex shape expressed in a textbook or a display device two-dimensionally may be directly expressed in a three-dimensional space. Particularly, if an educational curriculum is configured based on three-dimensional spatial coordinates like the electromagnetics, the somatic sense induction system may be used to enhance the quality of lecture and understanding of students.

Figure 23:
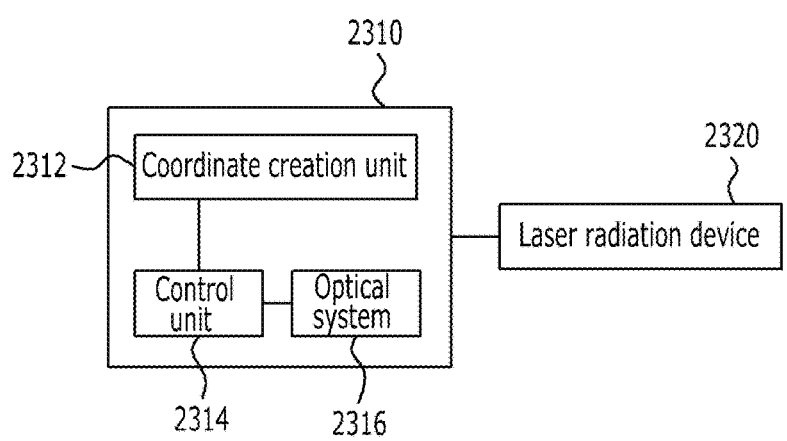
FIG. 23 is a view showing an example of using a somatic sense induction system together with a hologram apparatus as another embodiment of the present invention.

FIG. 23 is a view showing an example of using a somatic sense induction system together with a hologram apparatus as another embodiment of the present invention.

Referring to FIG. 23, a somatic sense induction system of the present invention may include a hologram creation unit 2310 and a laser radiation device 2320.

The hologram creation unit 2310 may include a coordinate creation unit 2312, a control unit 2314 and an optical system 2316.

The coordinate creation unit 2312 creates three-dimensional spatial coordinates at which a hologram object will be displayed.

The control unit 2314 may control the optical system 2316 so that the hologram object may be displayed at the three-dimensional spatial coordinates.

The optical system 2316 may be configured to include a light source, a mirror, an optical modulator, a beam splitter and the like. Since the configuration of an optical system of a general hologram apparatus may be applied to the optical system to be the same, detailed description thereof will be omitted.

The laser radiation device 2320 may receive the three-dimensional spatial coordinates from the hologram creation unit 2310 and generate air plasma by radiating a laser in the space of the received coordinates. The air plasma may induce a somatic sense on the skin of the user.

Figure 24:
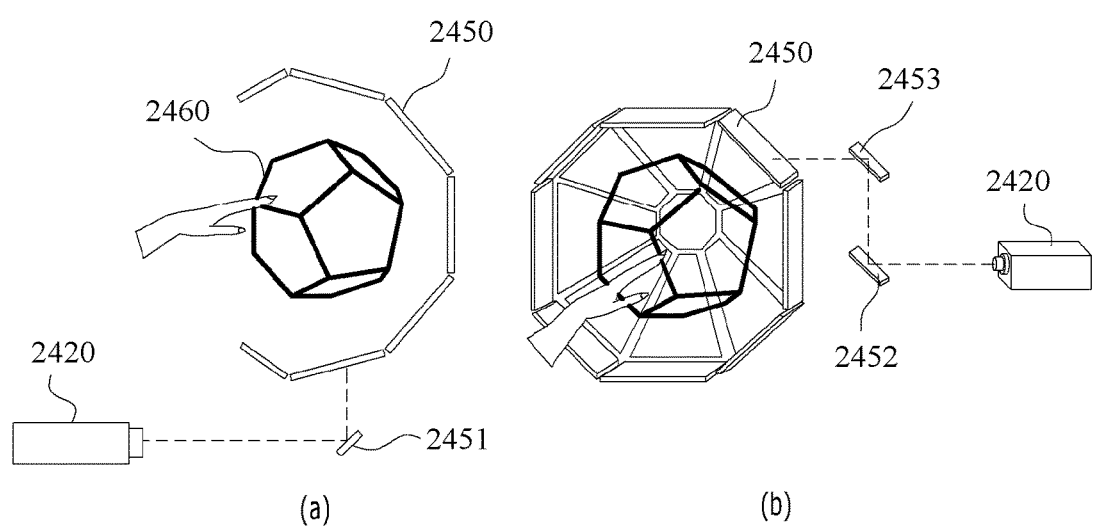
FIG. 24 is a view showing an example of generating air plasma on a hologram by a somatic sense induction system according to an embodiment of the present invention.

FIG. 24 is a view showing an example of generating air plasma on a hologram by a somatic sense induction system according to an embodiment of the present invention, in which FIG. 24(a) is a view showing that a mirror 2450 for reflecting a laser is arranged at an outer portion of an outer area of the hologram, and FIG. 24(b) is a view showing that mirrors 2450 for reflecting a laser are arranged in all directions of the outer area of the hologram.

The mirror 2450 may be freely arranged according to the shape of the hologram. The mirror 2450 may transmit a laser emitted from the laser radiation device 2420 to be radiated on the hologram 2460.

A plurality of reflection mirrors 2451, 2452 and 2453 for adjusting an optical path may be arranged between the mirror 2450 and the air plasma generation device.

If mirrors 2450 are arranged in all directions of the outer area of the hologram as shown in FIG. 24(b), a laser is radiated from the outside the hologram, and the user may feel a somatic sense on the palm and on the back of the hand when the user touches the hologram.

Figure 25:
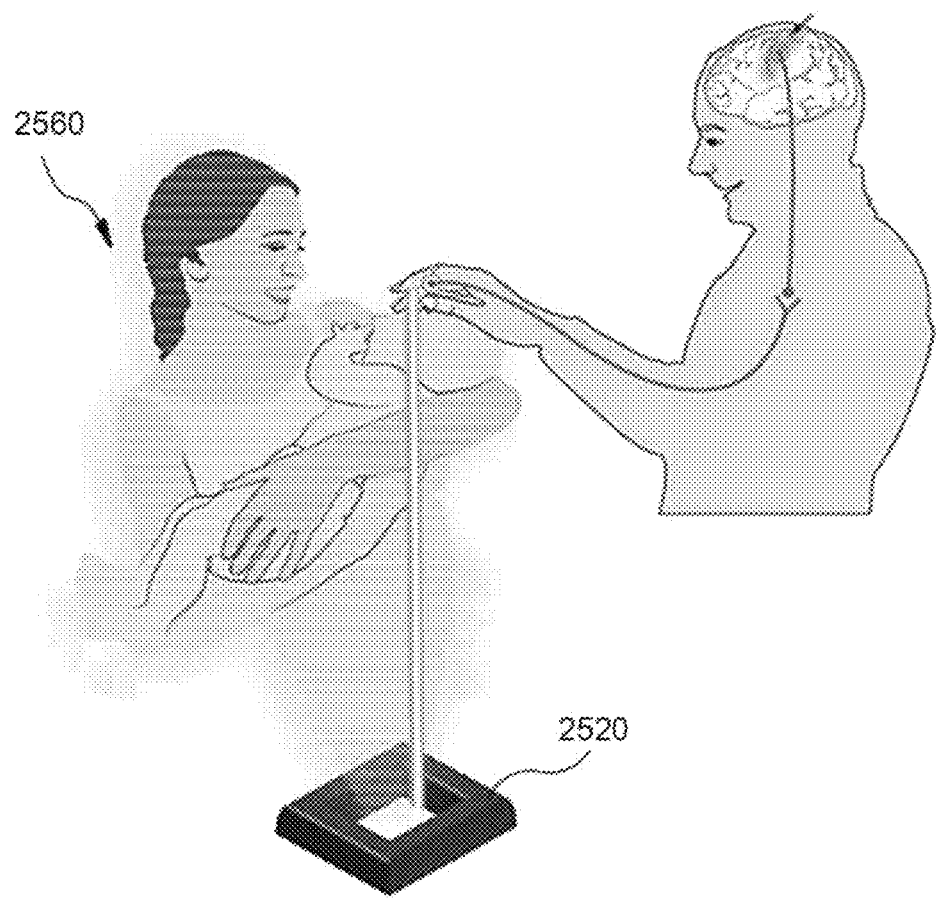
FIG. 25 is a view showing another example of generating air plasma on a hologram by a somatic sense induction system according to the present invention.

FIG. 25 is a view showing another example of generating air plasma on a hologram by a somatic sense induction system according to the present invention.

FIG. 25 is a view showing an example in which a father staying far away touches a hologram image 2560 of a baby and a mother.

If a laser radiation device 25820 generates air plasma by radiating a laser according to the hologram, the user may feel a tactile sense as if the user actually touches the baby.

In addition, since the laser radiation device may adjust the shape or duration of the air plasma by appropriately adjusting several parameters of a laser, it may enhance a sense of reality much more than seeing only a hologram.

Figure 26:
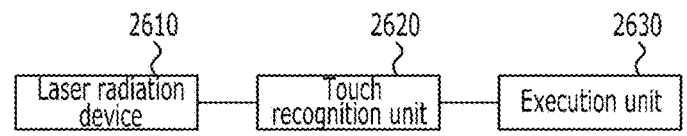
FIG. 26 is a view showing an interface device for handling a multimedia system of a vehicle according to the present invention.

FIG. 26 is a view showing an interface device for handling a multimedia system of a vehicle using a laser radiation device described above.

Referring to FIG. 26, an interface device for handling a multimedia system of a vehicle according to the present invention may include a laser radiation device 2610, a touch recognition unit 2620 and an execution unit 2630.

The laser radiation device 2610 may generate air plasma by radiating a laser in a coordinate space set in advance near a driver. The air plasma may last as long as a preset time and may be formed in a variety of shapes such as a circular shape, a rectangular shape and the like.

One or more air plasmas may be formed. Although the number of air plasmas is not limited, air plasmas may be generated as many as the multimedia handling buttons of a vehicle.

The air plasma may induce a somatic sense on the skin of the user.

If the driver touches the air plasma formed in the space, the touch recognition unit 2620 recognizes the air plasma. Particularly, if a plurality of air plasmas is formed, it may be sensed that which part of the plurality of air plasmas is touched. Since the air plasmas are formed in a preset coordinate space, the touch recognition unit 2620 may sense which part is touched by sensing a touched point. An infrared ray may be used as a method of sensing a touch, and a leap motion method, which is widely used recently, may also be used.

The execution unit 2630 receives a touched space from the touch recognition unit 2620 and executes a command corresponding to the space. A multimedia execution command corresponding to each position of the preset coordinate space is set in advance, and the execution unit 2630 may execute a corresponding command if a specific space is touched.

Figure 27:
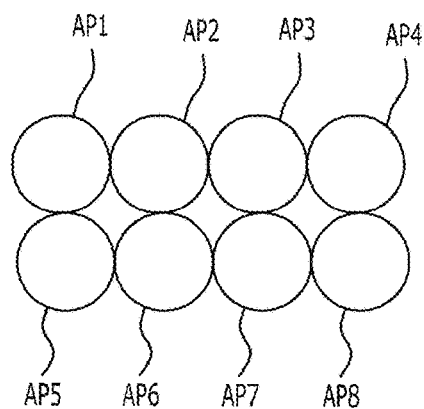
FIG. 27 is a view showing an example of the number and shapes of air plasmas.

For example, if it is assumed that the air plasma forms eight circles as shown in FIG. 27, a communication command of a mobile terminal may be executed if a first air plasma AP1 is touched, and a music playback program may be executed if a second air plasma AP2 is touched.

Figure 28:
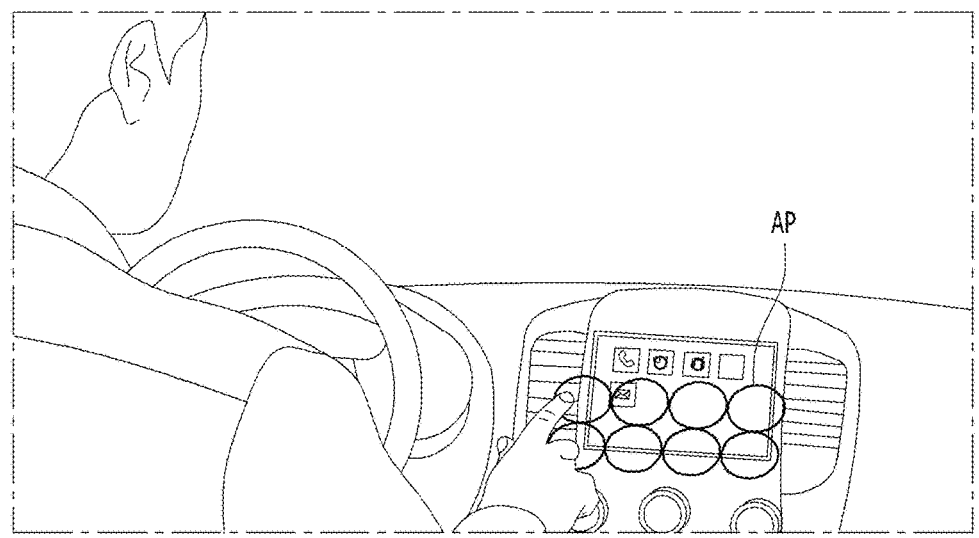
FIG. 28 is a view showing an example of generating air plasma by an interface device according to an embodiment of the present invention.

FIG. 28 is a view showing an example of generating air plasma by an interface device for handling a multimedia system of a vehicle according to an embodiment of the present invention.

Referring to FIG. 28, an interface device for handling a multimedia system of a vehicle may form a plurality of air plasmas in a preset space near the driver's seat, and the driver may handle the multimedia device by easily touching the air plasma generated near the driver.

In the prior art, although it is not easy to handle a multimedia device while driving since the driver should touch a touch pad arranged on the front side of the vehicle, if the air plasma of the present invention is used, the driver may easily handle the multimedia device.

According to the present invention, since a laser may not be radiated directly on a skin tissue of a user, there is an effect of inducing a somatic sense without damaging the skin tissue.

In addition, according to the present invention, since different kinds of energy emitted from the air plasma can be utilized, there is an effect of inducing a somatic sense by mechanisms different from each other.

In addition, according to the present invention, there is an effect of inducing a somatic sense on all media existing in an area close to a point where air plasma is generated.

A somatic sense induction system according to the present invention and an environment in which various tactile senses can be induces by the system have been described with reference to the drawings. The embodiments of the present invention described above are disclosed for illustrative purposes, and the present invention is not limited thereto. In addition, those skilled in the art may make diverse modifications and changes within the spirit and scope of the present invention, and all the modifications and changes should be regarded as belonging to the scope of the present invention.

What is claimed is:

1. A somatic sense induction system using air plasma, the system comprising:
   a laser radiation device for controlling parameters of a laser and generating the air plasma at one point in air by radiating the laser at the one point in the air;
   a lens for inducing the generation of the air plasma by focusing the laser radiated from the laser radiation device on the one point in the air;
   an information collection unit for collecting biological information of a driver or driving information of a vehicle; and
   a drowsiness determination unit for receiving the biological information of a driver or the driving information of a vehicle and determining whether the driver is in a drowsy state,
   wherein a shock wave and an electric field generated by the air plasma induce a state change in a medium existing in an area affected by the shock wave and the electric field, and
   wherein if it is determined by the drowsiness determination unit that the driver is in a drowsy state, the laser radiation device generates air plasma by radiating a pulse laser at a point around the driver.

2. The system according to claim 1, wherein the medium is a skin of a human body.

3. The system according to claim 2, wherein the shock wave induces a state change in the skin of the human body by making peripheral nerves generate an action potential by stimulating a cell in the skin of the human body.

4. The system according to claim 2, wherein the electric field generates a potential in a cell of the skin of the human body and induces a state change in the skin of the human body by making peripheral nerves stimulated by the generated potential generate an action potential.

5. The system according to claim 1, wherein the parameters of the laser include energy intensity, a pulse width, a pulse frequency, a stimulating time and a beam diameter.

6. The system according to claim 1, wherein the shock wave and the electric field generated by the air plasma induce a state change in a medium existing at a certain point inside a virtual sphere around a position where the air plasma is generated.

7. The system according to claim 1, wherein wavelength of the pulse laser is 1064 nm.

8. The system according to claim 1, wherein energy intensity of the pulse laser is between 35 mJ and 65 mJ.

9. The system according to claim 1, further comprising a temperature sensing unit for sensing temperature of a heating element of an electric device,
   wherein if the temperature sensed by the temperature sensing unit is higher than a preset temperature, the laser radiation unit generates air plasma by radiating a laser at a point above the electric device.

10. A somatic sense induction system using air plasma, the system comprising:
    a laser radiation device for controlling parameters of a laser and generating the air plasma at one point in air by radiating the laser at the one point in the air;
    a lens for inducing the generation of the air plasma by focusing the laser radiated from the laser radiation device on the one point in the air;
    a camera for photographing a user;
    a motion detection unit for receiving an image photographed by the camera and detecting a motion of the user; and
    a position detection unit for receiving motion information of the motion detection unit and detecting a position where the motion of the user is generated,
    wherein a shock wave and an electric field generated by the air plasma induce a state change in a medium existing in an area affected by the shock wave and the electric field, and
    wherein the laser radiation device generates air plasma by radiating a pulse laser at a point around a position where the motion of the user is performed.

11. The system according to claim 10, wherein the medium is a skin of a human body.

12. The system according to claim 11, wherein the shock wave induces a state change in the skin of the human body by making peripheral nerves generate an action potential by stimulating a cell in the skin of the human body.

13. The system according to claim 11, wherein the electric field generates a potential in a cell of the skin of the human body and induces a state change in the skin of the human body by making peripheral nerves stimulated by the generated potential generate an action potential.

14. The system according to claim 10, wherein the parameters of the laser include energy intensity, a pulse width, a pulse frequency, a stimulating time and a beam diameter.

15. The system according to claim 10, wherein the shock wave and the electric field generated by the air plasma induce a state change in a medium existing at a certain point inside a virtual sphere around a position where the air plasma is generated.

16. The system according to claim 10, wherein wavelength of the pulse laser is 1064 nm.

17. The system according to claim 10, wherein energy intensity of the pulse laser is between 35 mJ and 65 mJ.

18. The system according to claim 10, further comprising a temperature sensing unit for sensing temperature of a heating element of an electric device,
    wherein if the temperature sensed by the temperature sensing unit is higher than a preset temperature, the laser radiation unit generates air plasma by radiating a laser at a point above the electric device.

* * * * *